United States Patent [19]

Alberts et al.

[11] Patent Number: 4,774,137

[45] Date of Patent: Sep. 27, 1988

[54] SYNTHETIC RESIN POWDERS FOR COATINGS WITH REDUCED SURFACE RESISTANCE

[75] Inventors: Heinrich Alberts; Hans-Heribert Burgdörfer, both of Leverkusen, Fed. Rep. of Germany

[73] Assignee: Bayer Aktiengesellschaft, Leverkusen, Fed. Rep. of Germany

[21] Appl. No.: 72,540

[22] Filed: Jul. 13, 1987

Related U.S. Application Data

[63] Continuation of Ser. No. 808,100, Dec. 12, 1985, abandoned.

[30] Foreign Application Priority Data

Dec. 22, 1984 [DE] Fed. Rep. of Germany ....... 3447250

[51] Int. Cl.⁴ ............................ B32B 5/16; H01B 1/06
[52] U.S. Cl. ................................... 428/407; 252/511; 252/512; 252/518; 252/510; 427/189; 427/222; 427/195
[58] Field of Search ....................... 252/511, 512, 518; 524/495, 496, 401, 439; 264/105, 126, 131; 427/222, 189, 191; 428/403, 407

[56] References Cited

U.S. PATENT DOCUMENTS

| | | | |
|---|---|---|---|
| 4,124,747 | 11/1978 | Murer et al. | 252/511 |
| 4,169,816 | 10/1979 | Tsien | 252/511 |
| 4,412,938 | 11/1983 | Kukizaki et al. | 252/511 |
| 4,421,678 | 12/1983 | Mehetd | 252/511 |

*Primary Examiner*—Josephine Barr
*Attorney, Agent, or Firm*—Connolly and Hutz

[57] ABSTRACT

This invention relates to synthetic resin powders for coating agents and the use thereof for the production of coatings with reduced surface resistance.

9 Claims, No Drawings

SYNTHETIC RESIN POWDERS FOR COATINGS WITH REDUCED SURFACE RESISTANCE

This is a continuation of application Ser. No. 808,100, filed on Dec. 12, 1985, abandoned.

This invention relates to synthetic resin powders for coating agents and the use thereof for the production of coatings with reduced surface resistance.

The use of polymer powders of particular particle size for coating metal, glass, ceramics, wood or other materials is known. Polyethylene, PVC, polyamides, polyesters, saponified ethylene vinyl acetate copolymers, polyurethanes or epoxide resins are conventionally used for these purposes. The tendency towards high electrostatic charging both in a pulverulent state and as coating surface is common to all products.

The use of antistatic agents, the addition of conductive additives or surface treatment is usual for reducing the surface resistance (for example galvanic metallization c.f. A. Bledzko and D. Stankowska in Kunststoffe 74 (1984), p. 2 et seq). The use of conductive carbon black as a polymer additive is known and is described, for example, in Kautschuk-Gummi-Kunststoffe 37 (1984) No. 3, p. 198 et seq or in the company publication Carbon Black XE-2 ® by Phillips Petroleum Co. (12/1981).

A conductive additive (for example as powder, fibre, ball, platelet, etc.) is normally incorporated according to the known processes in the polymer solution or polymer melt.

With the use of finely-divided additives, for example carbon black, a reduction in surface resistance from a specific minimum concentration is achieved. For example the electric surface resistance of polyethylene (for example Marlex 47100 ® according to the above company publication by Phillips Petroleum) is greater than $10^{16}$ ohm cm. On adding 10% of carbon black XE 2 ®, the surface resistance falls to 40 ohm cm. Polymers modified in this manner can be used for the production of conductive surface formations, for example by melt extrusion.

Moreover, the above-mentioned polymer mixtures with conductive additives can be converted into powders by grinding, and these powders can be used for coating purposes. Owing to the mass incorporation of additives, (1) the necessary costs for reducing surface resistance are substantial and (2) the mechanical strength values of the coating (for example tear strength) are substantially impaired by the high quantities of additives.

On the other hand, DE-PS No. 2 255 033 teaches the incorporation of pigments in synthetic resin powder by mixing, for example in friction mixers. The mixing process is continued after sufficiently heating the grain surface of the synthetic resin powder until the finely-divided additive material has penetrated the interior of the heated surface regions of the synthetic resin grains. Suitable mixers are described in U.S. Pat. No. 3,229,002 and in U.S. Pat. No. 3,472,491. Pigments are generally used as additives, so as to give the resin compositions the desired colour.

It has now been found that in the production of mixtures of synthetic resin powders and finely-divided conductive additives, preferably conductive carbon black, in an intensive mixer, continuing the mixing process until the polymer powder thermoplastically softens, a reduction in surface resistance of the coatings produced from these polymer powders can already be achieved with from 0.01 to 1.5% by weight, preferably from 0.1 to 0.5% by weight of conductive additive, preferably conductive carbon black.

The invention thus provides synthetic resin powders containing from 0.01 to 1.5% by weight, preferably from 0.1 to 0.5% by weight of conductive additives, preferably conductive carbon black, characterised in that the incorporation of the conductive additives in the synthetic resin powder takes place in an intensive mixer, continuing the mixing process at elevated temperature until the surface of the synthetic powder thermoplastically softens, and the additive is bound on the surface to the polymer, and coatings produced with the synthetic resin powders modified in this manner.

In a preferred embodiment, thermoplastically softening synthetic powders are treated with from 0.1 to 0.5% by weight of a conductive carbon black and the additive is bound to the synthetic resin powder at an elevated temperature by the mixing process.

In a particularly preferred embodiment, for the production of surface coatings with reduced surface resistance, synthetic powders based on saponified ethylene vinyl acetate copolymers with from 0.01 to 1.5% by weight, preferably from 0.1 to 0.5% by weight of a conductive carbon black are mixed at an elevated temperature until the carbon black pigment is bound to the saponified ethylene vinyl acetate copolymer via the polymer powder particles softened on the surface.

The grain size of the polymer powders used for the mixing process is variable within a wide range. According to the application process, powders in the grain size range of from 0 to 350μ are preferably used. For powders which are to be applied according to the powder painting process, the preferred grain size distribution is in a range of from 80 to 250μ. Powders which are to be applied according to the usual EPS method should be less than 150μ, preferably <80μ.

The following are named as examples of synthetic powders: powders of polyolefins such as polyethylene homo- and copolymers which are obtained according to the different processes of ethylene homo- and copolymerisation, polypropylene homo- or copolymers. Particularly favourable results are obtained with ethylene copolymers which contain small quantities of vinyl acetate, (meth)acrylic acid and/or (meth)acrylic acid esters or maleic acid anhydride. In addition to the polyolefin powders, powders of vinyl chloride homo- and copolymers can be used according to the invention.

PVC powders can contain plasticizers based on low or high molecular weight compounds and additional additives. Moreover, polyamide powders, preferably of polyamides which contain $C_8$- to $C_{14}$-alkyl chains in the main chain, can also be used according to the invention. The polyamides can contain additional addition components, for example elastifying additives.

Thermoplastically softening polyesters and cellulose esters can likewise be used according to the invention, as well as the known powder lacquers based on epoxide and polyurethane resin.

Preferred coating materials are, for example, saponified ethylene vinyl acetate copolymers (for example DE-PS No. 1 669 151). The saponified ethylene vinyl acetate copolymers can be used alone or in admixture with cross-linking agents such as polyfunctional isocyanates (for example DE-PS No. 2 064 098 or DE-PS No. 2 709 451). Moreover, carboxyl group-containing saponified ethylene vinyl acetate copolymers are also suitable for use according to the invention. The vinyl acetate content of the ethylene vinyl acetate copolymers used for the saponification or partial saponification is flexible, that is all copolymers with vinyl acetate contents of from 0.5 to 99% by weight can be used. Copolymers with a vinyl acetate content of from 25 to 50% by weight are preferred. The melt-flow index measured at 190° C. and with stressing of 2.16 kp, should preferably be >25 [g/10 min].

Finely-divided conductive additives are preferably used according to the invention, for example metal powders, conductive pigments, preferably conductive carbon black as described, for example, in the company journal Carbon Black XE-2 ® by Phillips Petroleum Co. (12/1981) or in Kautschuk+Gummi-Kunststoffe 37 (1984) no. 3, p. 198 et seq.

The mixtures can additionally contain levelling agents, for example acrylic acid ester polymers as well as coupling agents, pigments and auxiliaries.

For the production of the powder mixtures according to the invention, an intensive mixer, the mixing performance of which at a circumferential speed of the mixing device of about 40 m/sec is at least 0.8 kW/kg of mixing bulk, is charged with the components to be mixed. A premixing can firstly optionally be achieved with reduced rotational speed. The incorporation of the conductive additives can then be carried out at a circumferential speed of the mixing device of about 40 m/sec, corresponding to a specific mixing performance of from about 0.1 to 1.5 kW/kg of mixing bulk, increasing the temperature until the desired maximum mixing temperature is achieved.

The coating powders obtained according to the invention produce coatings, the surface resistance of which is $<10^{11}$ ohm.cm, preferably $<10^6$ ohm.cm.

The coatings obtained with the products according to the invention are particularly used when electrostatic charging is to be avoided, for example in mining for protection against corrosion in previously endangered plants, for coating electronic components, housings for high-voltage-sensitive electronics or where a high frequency protection is desired.

EXAMPLES

General procedure

The components set out in the table are filled in an intensive mixer, for this series of experiments a Henschel fluid mixer FM 10 was used. The mixing is carried out after premixing for 30 sec with a mixing performance of about 1.2 kW/kg of mixing bulk within the given time until the maximum temperature is achieved. The mixing bulk is then cooled, preferably in a cooling mixer stage, so as to avoid agglomeration.

The materials used for the mixtures in the following examples are:

Polymer powder 1: saponified ethylene vinyl acetate copolymer which contains from about 16 to 17% by weight of vinyl alcohol units and has a melt-flow index (measured at 150° C. and with stressing of 2.16 kp) of 12.2 g/10 min.
Polymer powder 2: polyvinyl chloride
Polymer powder 3: polyethylene
Polymer powder 4: polyamide

TABLE 1

| Example no. | Polymer powder 1 | Polymer powder 2 | Polymer powder 3 | Polymer powder 4 | conductive carbon black | mixing time | maximum temperature | surface resistance ① ② ohm cm |
|---|---|---|---|---|---|---|---|---|
| 1 | 1500 g | — | — | — | 3.0 g | 570 | 90° C. | $2.4 \times 10^6$ |
| 2 | 1500 g | — | — | — | 4.5 g | 600 | 90° C. | $1.1 \times 10^5$ |
| 3 | 1500 g | — | — | — | 6.0 g | 615 | 90° C. | $4.2 \times 10^4$ |
| 4 | 1500 g | — | — | — | 7.5 g | 675 | 92° C. | $1.3 \times 10^4$ |
| 5 | 1500 g | — | — | — | 7.5 g | 285 | 90° C. | $1.0 \times 10^4$ |
| 6 | — | 1500 | — | — | 4.5 g | 320 | 90° C. | $2.5 \times 10^6$ |
| 7 | — | — | 1500 | — | 4.5 g | 270 | 88° C. | $3.2 \times 10^5$ |
| 8 | — | — | — | 1500 | 4.5 g | 645 | 145° C. | $9.7 \times 10^4$ |

①The measurement of the surface resistance $R_{o,l}$ took place according to DIN 53 482/VDE 0303 part 3. The sample condition after pretreatment of 1 d/23° C./50% relative moisture and test climate 23° C./50% relative moisture corresponded to DIN 50 005. A cutting electrode was used as electrode at a measuring voltage of 10 V.
②The measurement of the surface resistance $R_{o,l}$ took place on surface coatings obtained by the powder painting coating of metal plates heated to 300° C. The immersion time of the metal plates (10 × 20 × 0.4 cm) was 3 sec, the thickness of the coating film about 400μ.

TABLE 2

| Example no. | Polymer powder | Conductive carbon black | Bayferrox$^R$ 303 T | OP-Wachs$^R$ (Hoechst) | acrylate levelling agent Modaflow$^R$ | surface resistance ① ② ohm cm |
|---|---|---|---|---|---|---|
| 9 | 1500 g | 15 g | 7.5 g | — | — | $3.3 \times 10^3$ |
| 10 | 1280 g | 75 g | — | 45 g | — | $7.5 \times 10^3$ |
| 11 | 1500 g | 30 g | — | — | 5 g | $5.7 \times 10^3$ |

①The measurement of the surface resistance $R_{o,l}$ took place according to DIN 53 482/VDE 0303 part 3. The sample condition after pretreatment of 1 d/23° C./50% relative moisture and test climate 23° C./50% relative moisture corresponded to DIN 50 005. A cutting electrode was used as electrode at a measuring voltage of 10 V.
②The measurement of the surface resistance $R_{o,l}$ took place on surface coatings obtained by the powder painting coating of metal plates heated to 300° C. The immersion time of the metal plates (10 × 20 × 0.4 cm) was 3 sec, the thickness of the coating film about 400μ.

We claim:

1. In a synthetic resin powder for a coating composition containing electrically conductive additives, the improvement comprises incorporating 0.01 to 1.5% by weight of the conductive additives in the synthetic resin powder in an intensive mixer at an elevated temperature until the surface of the synthetic resin powder thermoplastically softens and the additive is bound on the surface of the polymer.

2. Synthetic resin powder according to claim 1, containing from 0.01 to 0.5% by weight of conductive additives, characterised in that the incorporation of the conductive additives in the synthetic resin powder takes place in an intensive mixer, continuing the mixing process at an elevated temperature until the surface of the synthetic powder thermoplastically softens and the additive is bound on the surface of the polymer.

3. Synthetic resin powders according to claim 1, characterised in that conductive carbon black is used as conductive additive.

4. Synthetic resin powders according to claim 1, characterised in that a saponified ethylene vinyl acetate copolymer is used as synthetic resin powder.

5. Synthetic resin powders according to claim 4, characterised in that from 0.01 to 1.5% by weight of conductive carbon black is used as conductive additive.

6. Synthetic resin powders according to claim 5, characterised in that from 0.1 to 0.5% by weight of conductive carbon black is used.

7. Synthetic resin powders according to claim 4 characterized in that from 0.1 to 0.5% by weight of conductive carbon black is used.

8. Synthetic resin powders according to claim 1 wherein the electrical surface resistance is at most 10 ohm.cm.

9. Synthetic resin powders according to claim 8 wherein the resistance is less than $10^6$ ohm.cm.

* * * * *